US012095182B2

(12) United States Patent
Itami et al.

(10) Patent No.: US 12,095,182 B2
(45) Date of Patent: Sep. 17, 2024

(54) CIRCUIT INTEGRATED ANTENNA

(71) Applicant: Nippon Telegraph and Telephone Corporation, Tokyo (JP)

(72) Inventors: Go Itami, Tokyo (JP); Hiroshi Hamada, Tokyo (JP); Hideyuki Nosaka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 145 days.

(21) Appl. No.: 17/912,218

(22) PCT Filed: Apr. 20, 2020

(86) PCT No.: PCT/JP2020/017022
§ 371 (c)(1),
(2) Date: Sep. 16, 2022

(87) PCT Pub. No.: WO2021/214815
PCT Pub. Date: Oct. 28, 2021

(65) Prior Publication Data
US 2023/0130741 A1 Apr. 27, 2023

(51) Int. Cl.
*H01Q 13/08* (2006.01)
*H01Q 9/04* (2006.01)

(52) U.S. Cl.
CPC ............. *H01Q 9/045* (2013.01); *H01Q 13/08* (2013.01)

(58) Field of Classification Search
None
See application file for complete search history.

(56) References Cited

U.S. PATENT DOCUMENTS

2007/0290927 A1* 12/2007 Rowell ................ H01Q 19/005 343/834
2013/0141295 A1* 6/2013 Jiang .................... H01Q 13/103 343/746
2018/0151955 A1* 5/2018 Zhang .................... H01Q 5/371
2019/0229409 A1* 7/2019 Hashimoto ............ H01Q 9/285

FOREIGN PATENT DOCUMENTS

CN 108054507 A * 5/2018
JP H11317614 A * 11/1999
KR 20080070240 A * 7/2008
KR 20180089590 A * 8/2018

OTHER PUBLICATIONS

Deng et al. "340 GHz On-Chip 3-D Antenna With 10 dBi Gain and 80% Radiation Efficiency," IEEE Transactions on Terahertz Science and Technology, vol. 5, No. 4, Jul. 2015, pp. 619-627.
Hau et al., "High Efficiency, Wide Dynamic Range Variable Gain and Power Amplifier MMICs for Wide-Band CDMA Handsets," IEEE Microwave and Wireless Components Letters, vol. 11, No. 1, Jan. 2001, pp. 13-15.
Lin et al., "A Compact Edge-Fed Filtering Microstrip Antenna with 0.2 dB Equal-Ripple Response," Proceedings of the 39th European Microwave Conference, 29 Sep.-Oct. 1, 2009, Rome, Italy, pp. 378-380.

* cited by examiner

*Primary Examiner* — Dameon E Levi
*Assistant Examiner* — Anh N Ho
(74) *Attorney, Agent, or Firm* — Slater Matsil, LLP

(57) ABSTRACT

Stub conductors are disposed so as to surround an outer periphery of a patch conductor and be spaced from the patch conductor with a gap positioned between the stub conductors and the patch conductor.

12 Claims, 17 Drawing Sheets

CIRCUIT INTEGRATED ANTENNA

CROSS-REFERENCE TO RELATED APPLICATIONS

This application is a national phase entry of PCT Application No. PCT/JP2020/017022, filed on Apr. 20, 2020, which application is hereby incorporated herein by reference.

TECHNICAL FIELD

The present invention relates to a circuit-integrated antenna mounted on an integrated circuit such as a monolithic microwave integrated circuit.

BACKGROUND

In a device for wireless communication such as a cellular phone, features such as large capacity, small size, and portability are strongly demanded. In order to implement these features, widening of the band of each of a radio-frequency electronic circuit (hereinafter referred to as an RF circuit) functioning as a radio-frequency (RF) front end portion of a device for wireless communication provided in a terminal and an antenna (this leads to an increase in data rate), and a reduction in the size of each of the RF circuit and the antenna are important.

In general, the bandwidth of the RF front end is determined by the operating bandwidths of radio-frequency components such as an analog circuit including an amplifier or a frequency converter which is a constituent element of the RF front end, and an antenna. With regard to the operating bandwidths of the radio-frequency components, when it is assumed that a ratio to a center frequency of an operating band (referred to as a fractional bandwidth) is constant (this assumption usually holds: NPL 1), it is possible to increase the bandwidth in proportion to a carrier wave frequency by making the carrier wave frequency higher. In addition, when the carrier wave frequency is made higher, the wavelength of a wireless signal becomes shorter, and hence it is also possible to reduce the size of a component part including an impedance element (a quarter-wave line or the like) which is determined by the analog circuit or the wavelength of the antenna. Consequently, as means for responding to needs such as an increase in the data rate of the device for wireless communication and a reduction in the size of the device for wireless communication, making the carrier wave frequency higher is an effective method.

From these points of view, in recent years, a study of a high-speed/small-sized wireless communication device which uses superhigh frequencies such as millimeter waves and THz waves is actively conducted. A problem which arises when the millimeter waves or the THz waves are used is a connection portion between the radio-frequency circuit and the antenna. In a superhigh frequency band which exceeds 300 GHz, when a method which is used in a low frequency band such as wire bonding or a flip chip is applied to the connection portion, a large connection loss occurs due to inductance caused by the physical length of the connection portion. The use of an antenna integrated with the radio-frequency circuit (on-chip antenna: NPL 2) can eliminate the connection portion between the radio-frequency circuit and the antenna, and hence the use thereof is effective at reducing the loss in the superhigh frequency band. In addition, the antenna is produced by a semiconductor integration process, and hence, in general, the antenna is small in size and contributes to a reduction in the size of a wireless communication device.

Examples of the representative configuration of the on-chip antenna include a patch antenna and a slot antenna. The operating principles of these antennas are basically similar to those of a dipole antenna, and an electric field is radiated by forming standing wave distributions of voltage and current on an antenna conductor pattern. The structure of each of the antennas is simple, and hence it is easy to manufacture the antenna. However, a resonance phenomenon by the standing wave formation is used, and hence the antenna exhibits characteristics of a narrow band determined by a Q-factor of the resonance in general. On the other hand, an example of an antenna having a wide band and relatively high directivity includes a Vivaldi antenna. However, the structure of the antenna, which corresponds to about a wavelength, is large, a scheme such as multi-layering is necessary when beam forming is performed, and, therefore, the antenna is not suitable from the viewpoint of one-chip mounting.

CITATION LIST

Non Patent Literature

[NPL 1] G. Hau, T. B. Nishimura, and N. Iwata, "High Efficiency, Wide Dynamic Range Variable Gain and Power Amplifier MMICs for Wide-Band CDMA Handsets", IEEE Microwave and Wireless Components Letters, Vol. 11, pp. 13-15, January 2001

[NPL 2] X. D. Deng, Y. Li, C. Liu, W. Wu, and Y. Z. Xiong, "340 GHz On-Chip 3-D Antenna With 10 dBi Gain and 80% Radiation Efficiency", IEEE Trans. Terahertz Sci. Technol, Vol. 5, pp. 619-627, July 2015

[NPL 3] C. kai and S. J. Chung, "A Compact Edge-Fed Filtering Microstrip Antenna with 0, 2 db Equal-Ripple Response", in Proc. 39th Eur. Microw. Conf. (EuMC 2009), Rome, Italy, pp. 378-380, October 2009.

SUMMARY

Technical Problem

However, in such a conventional structure, directivity is low and practical radiation efficiency of radiation power in a specific reception direction from input is low, and hence a problem arises in that a transmission distance is reduced. In addition, the conventional structure is a resonance system having a single frequency, and hence frequency characteristics of radiation are characteristics having a peak at the single frequency, and a problem arises in that it is difficult to secure the bandwidth and increase transmission speed. Even in the case where the on-chip antenna having a wide band is designed as a solution method, it is necessary to include a plurality of resonance structures, and hence a problem arises in that an element size is increased and it is difficult to arrange elements in an array.

Embodiments of the present invention solve such problems, and an object thereof is to provide a circuit-integrated antenna capable of achieving a reduction in the size of the antenna, increases in directivity and gain, and widening of a band in radiation characteristics at the same time.

Means for Solving the Problem

In order to attain the above object, a circuit-integrated antenna according to embodiments of the present invention is a circuit-integrated antenna mounted on a substrate which constitutes an integrated circuit, the circuit-integrated antenna including: a patch conductor which is formed on a surface of a substrate and radiates a fed electromagnetic field; a feeder line which is formed on the surface of the substrate and feeds an input electromagnetic field to the patch conductor; two slits which are formed so as to extend toward an inner side of the patch conductor on both sides of a connection portion between the patch conductor and the feeder line, and are parallel to the feeder line; and a pair of stub conductors which are formed on the surface of the substrate and are provided so as to protrude from both sides of the feeder line, wherein the pair of stub conductors are symmetrically disposed to have the feeder line between the pair of stub conductors so as to surround an outer periphery of the patch conductor and be spaced from the patch conductor with a first gap positioned between the pair of stub conductors and the patch conductor.

Effects of Embodiments of the Invention

According to embodiments of the present invention, it is possible to achieve the reduction in the size of the antenna, the increases in directivity and gain, and the widening of the band in the radiation characteristics at the same time.

DETAILED DESCRIPTION OF ILLUSTRATIVE EMBODIMENTS

Next, embodiments of the present invention will be described with reference to the drawings.

First Embodiment

Figure 1:
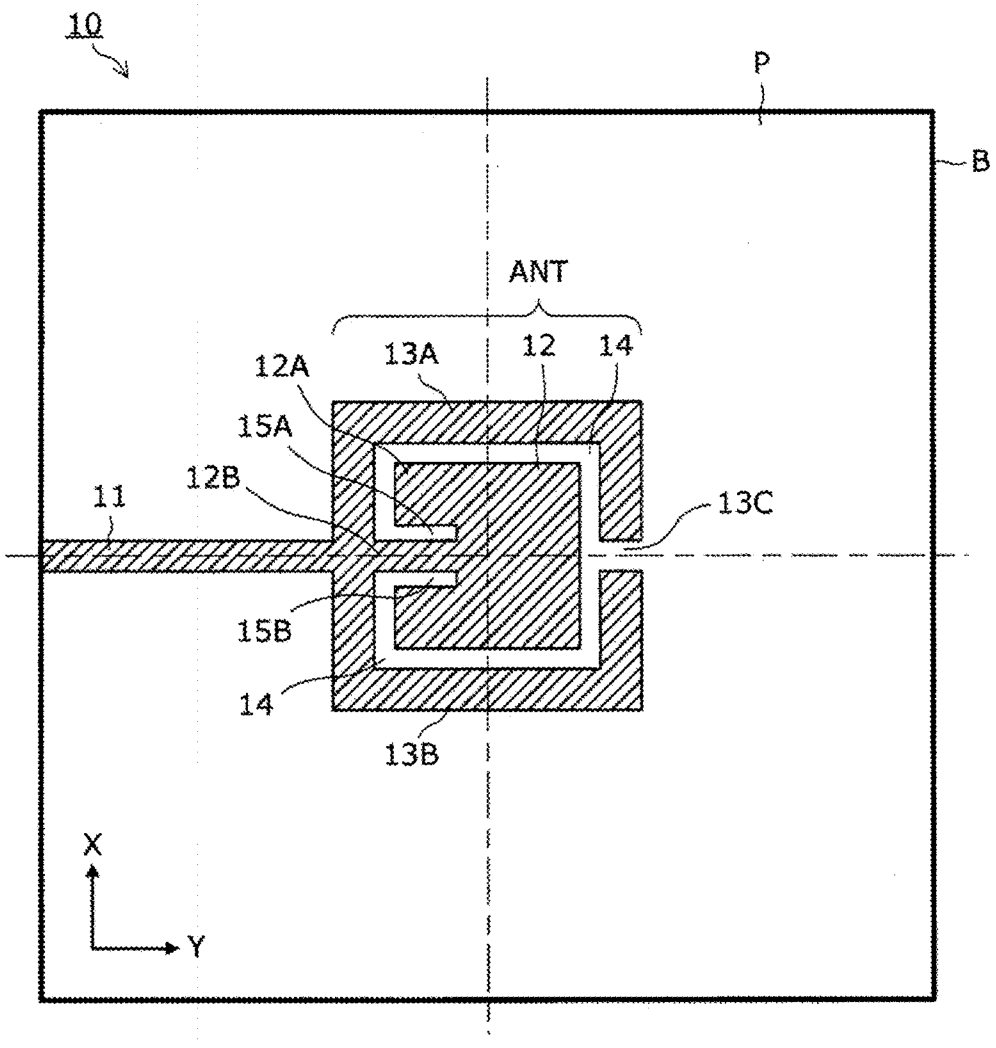
FIG. 1 is a plan view showing the configuration of a circuit-integrated antenna according to a first embodiment.
Figure 2:
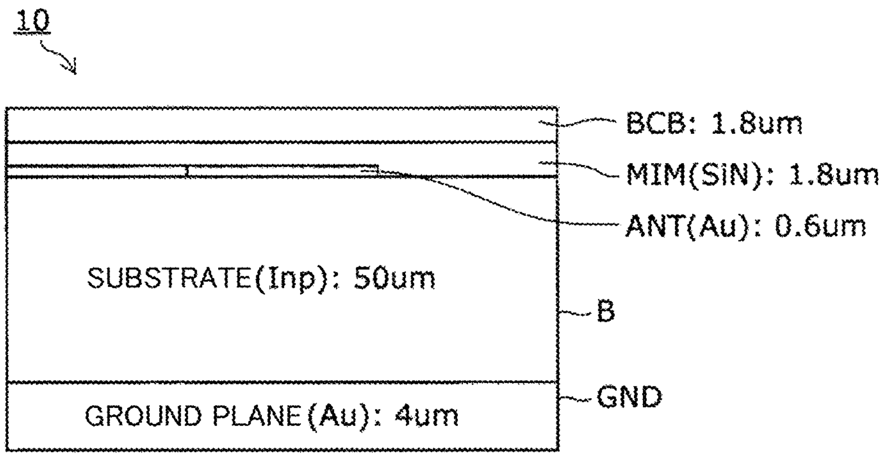
FIG. 2 is a cross-sectional view showing a multilayer structure of the circuit-integrated antenna according to the first embodiment.

First, with reference to FIG. 1 and FIG. 2, a description will be given of a circuit-integrated antenna 10 according to a first embodiment of the present invention. FIG. 1 is a plan view showing the configuration of the circuit-integrated antenna according to the first embodiment. FIG. 2 is a cross-sectional view showing a multilayer structure of the circuit-integrated antenna according to the first embodiment.

The circuit-integrated antenna 10 according to embodiments of the present invention is an antenna which is formed by common semiconductor process technique on a substrate B of a dielectric material constituting an integrated circuit such as a monolithic microwave integrated circuit (hereinafter referred to as an MMIC). In the following description, the circuit-integrated antenna 10 is sometimes referred to as an on-chip antenna.

As shown in FIG. 1 and FIG. 2, the circuit-integrated antenna 10 is constituted mainly by a feeder line 11, a patch conductor 12, stub conductors 13A and 13B, and a gap 14 (first gap) which are formed on a surface P of the substrate B. In the following description, a patch antenna having the stub conductors 13A and 13B according to embodiments of the present invention is sometimes referred to as a stub patch antenna.

The feeder line 11 is a transmission line which is constituted, as a whole, by a microstrip line such as a CPW (Coplanar Waveguide) and is used for feeding a radio-frequency electromagnetic field input from the outside to the patch conductor 12 and the stub conductors 13A and 13B. In the following description, for facilitating the description, on the surface P, a direction in which the feeder line 11 extends (a left-and-right direction relative to a paper sheet) is referred to as a direction Y, and a direction orthogonal to the direction Y (an up-and-down direction relative to the paper sheet) is referred to as a direction X.

The patch conductor 12 is an antenna element (radiating element) which is constituted by a conductor which has an entire outer shape formed into a substantially square shape when viewed in a plan view, and radiates the electromagnetic field fed from the feeder line 11. In the patch conductor 12, the feeder line 11 is connected to a connection portion 12B positioned at the center of a side 12A of the patch conductor 12.

In the vicinity of the connection portion 12B of the patch conductor 12, two slits 15A and 15B which are parallel to each other along the direction Y may be formed so as to extend toward an inner area of the patch conductor 12 from both ends of the gap 14. Each of two end portions of the gap 14 is formed so as to be connected to one end portion of each of the slits 15A and 15B. Each of the slits 15A and 15B has a length shorter than a width of the patch conductor 12 in the direction Y.

The stub conductors 13A and 13B are two stubs which are provided so as to protrude to both sides from the feeder line 11 in the vicinity of the connection portion 12B at which the feeder line 11 is connected to the patch conductor 12. Each of the stub conductors 13A and 13B is formed into a strip shape having a constant width so as to surround an outer periphery of the patch conductor 12 and be spaced from the patch conductor 12 with the gap 14 positioned between each of the stub conductors 13A and 13B and the patch conductor 12. A pair of the stub conductors 13A and 13*b* have shapes which are symmetric with respect to a center line extending along the direction Y which passes through the center of the patch conductor 12, and are symmetrically disposed at symmetric positions. One ends of the pair of the stub conductors 13A and 13B are connected to the feeder line 11 in the vicinity of the connection portion 12B, and the other ends of the pair of the stub conductors 13A and 13B are disposed so as to face each other with a gap 13C (second gap) positioned between the other ends thereof on the side of a side 12C opposite to the side 12A of the patch conductor 12.

In the following description, a description will be made by using, as an example, the case where the feeder line 11 is formed linearly, but the feeder line 11 is not limited thereto, and a bent portion, a curved portion, and further, a stub may also be provided in the feeder line 11. In addition, the description will be made by using, as an example, the case where the outside shape of each of the patch conductor 12 and the stub conductors 13A and 13B is a substantially square shape, but the outside shape thereof is not limited thereto, and the outside shape thereof may also be other shapes such as a substantially rectangular shape and a substantially circular shape. Further, the description will be made by using, as an example, the case where the inside shape of the stub conductors 13A and 13B is a substantially square shape, but the inside shape thereof is not limited thereto, and the inside shape thereof may also be a shape which conforms to the outer shape of the patch conductor 12 such that the width of the gap 14 becomes constant. Note that the width of the gap 14 does not need to be constant over the entire circumference (entire length), and an electric field strength distribution of the patch conductor 12 may be adjusted by changing the width of each of portions.

In addition, the description will be made by using, as an example, the case where a substrate made of a compound semiconductor of InP (Indium Phosphide) or the like is used as the substrate B, but the substrate B is not limited thereto, and a common dielectric substrate used in a radio-frequency circuit may also be used. Further, the description will be made by using, as an example, the case where a thin film of gold (Au) is used as a thin film conductor of each of the feeder line 11, the patch conductor 12, and the stub conductors 13A and 13B, but the thin film conductor is not limited thereto, and a common metal thin film conductor used in the radio-frequency circuit may also be used.

In an example of a multilayer structure in FIG. 2, a circuit mounting layer MIM having an MIM (Metal-Insulator-Metal) structure which uses, e.g., SiN (Silicon Nitride) is stacked on the surface P of the substrate B, and the feeder line 11, the patch conductor 12, the stub conductors 13A and 13B, and the gap 14 are formed in the circuit mounting layer MIM in a state in which the feeder line 11, the patch conductor 12, the stub conductors 13A and 13B, and the gap 14 are covered with SiN. In addition, on the circuit mounting layer MIM, an upper insulation layer BCB which uses an organic insulation film of, e.g., BCB (Benzo Cyclo Butene) is stacked.

On the other hand, on a bottom surface R of the substrate B, at least in an area facing the feeder line 11, the patch conductor 12, and the stub conductors 13A and 13B, a ground plane GND is formed. In the following description, the patch conductor 12 and the stub conductors 13A and 13B are sometimes collectively referred to as an antenna portion ANT.

As shown in FIG. 1, in the circuit-integrated antenna 10 according to the present embodiment, the stub conductors 13A and 13B which protrude to both sides from the feeder line 11 are disposed so as to surround the outer periphery of the patch conductor 12. With this, it is possible to form electric capacity between the patch conductor 12 and the stub conductors 13A and 13B, i.e., in the gap 14, and it is possible to achieve widening of a band and an increase in gain in radiation characteristics of the circuit-integrated antenna 10. In addition, when impedance matching with the feeder line 11 is performed, it is possible to perform adjustment by using sizes of the stub conductors 13A and 13B and the gap 14 in addition to sizes of the slits 15A and 15B. Consequently, in a design process of the circuit-integrated antenna 10, it becomes possible to obtain high flexibility in the control of center frequency, bandwidth, directivity, and gain.

Operation Analysis in First Embodiment

Next, with reference to FIGS. 3 to 13, a description will be given of an analysis result by simulation of the operation of the circuit-integrated antenna 10 according to the present embodiment. In the following description, for comparison, a description will be also given of an analysis result related to a conventional patch antenna.

Figure 3:
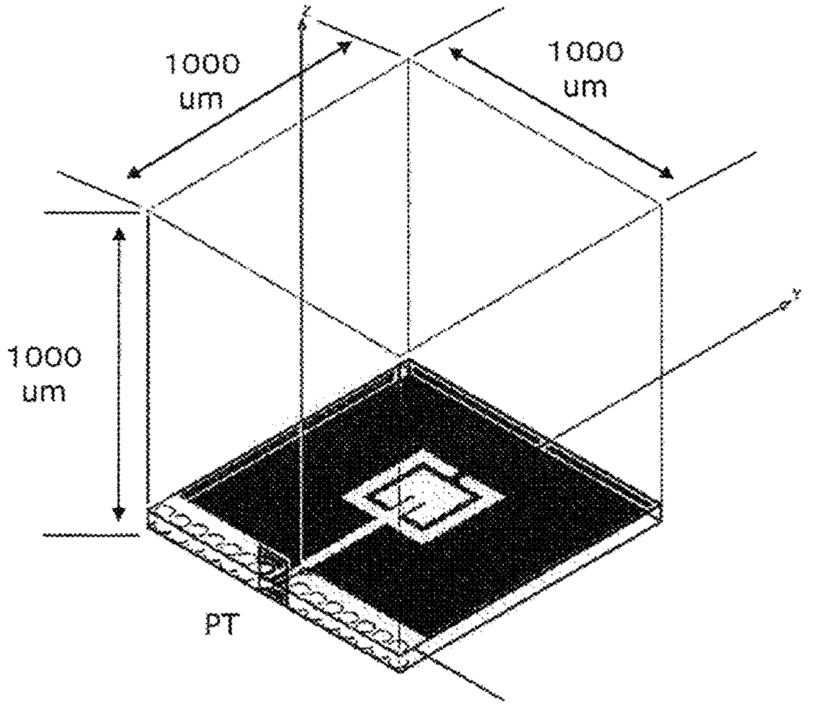
FIG. 3 is an explanatory view showing an analysis condition of the circuit-integrated antenna according to the first embodiment.
Figure 4:
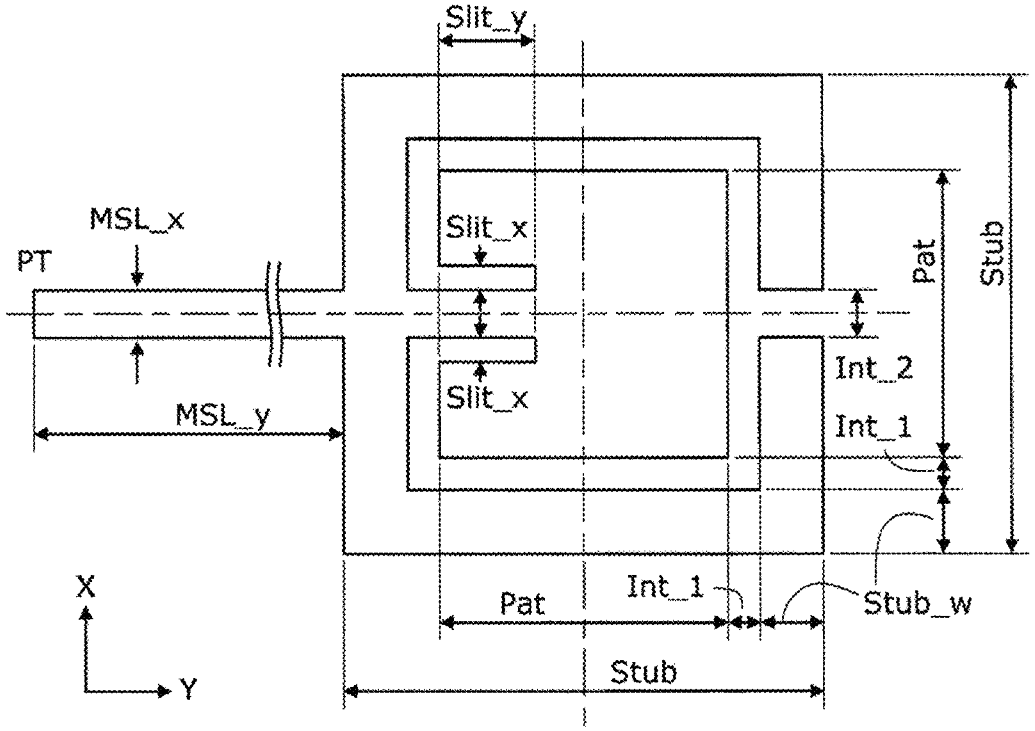
FIG. 4 is an explanatory view showing an antenna size of the circuit-integrated antenna according to the first embodiment.
Figure 5:
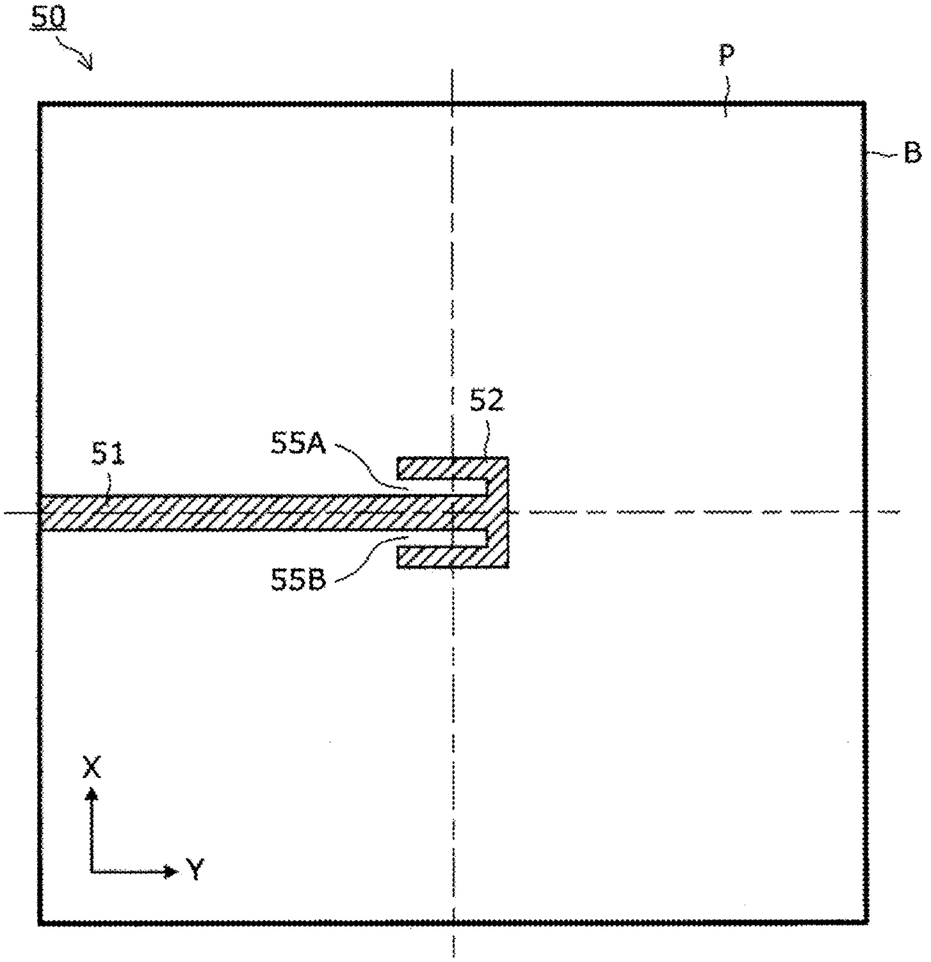
FIG. 5 is a plan view showing the configuration of a conventional patch antenna.
Figure 6:
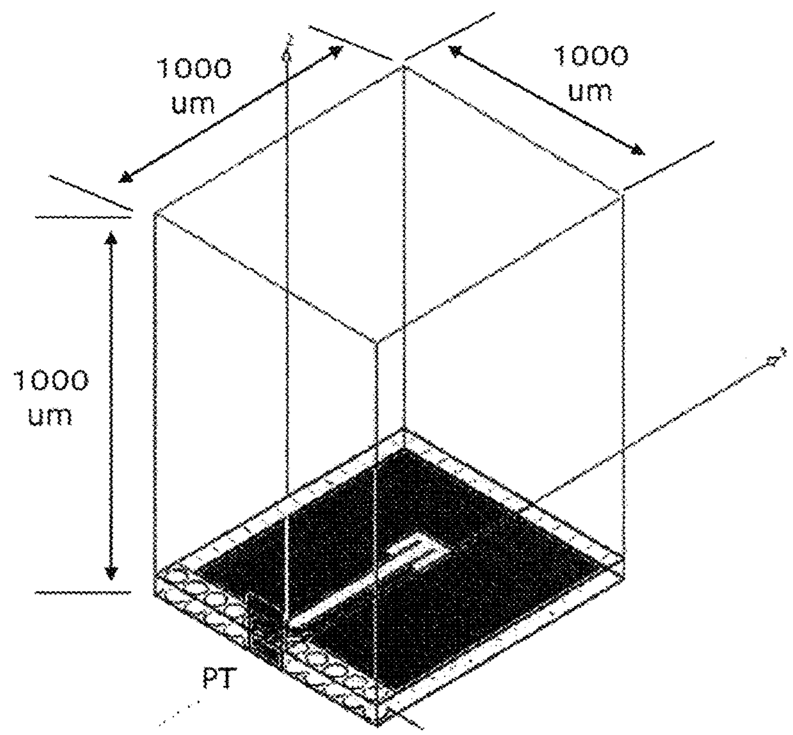
FIG. 6 is an explanatory view showing an analysis condition of the conventional patch antenna.
Figure 7:
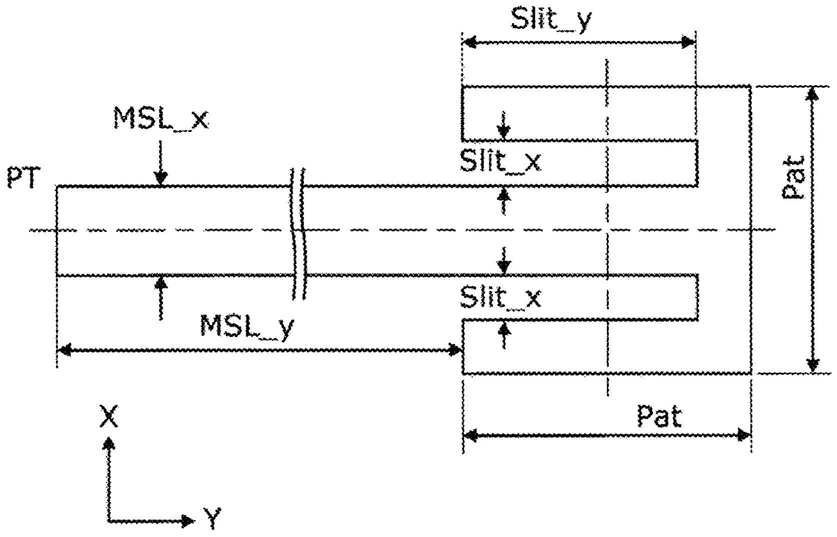
FIG. 7 is an explanatory view showing an antenna size of the conventional patch antenna.
Figure 8:
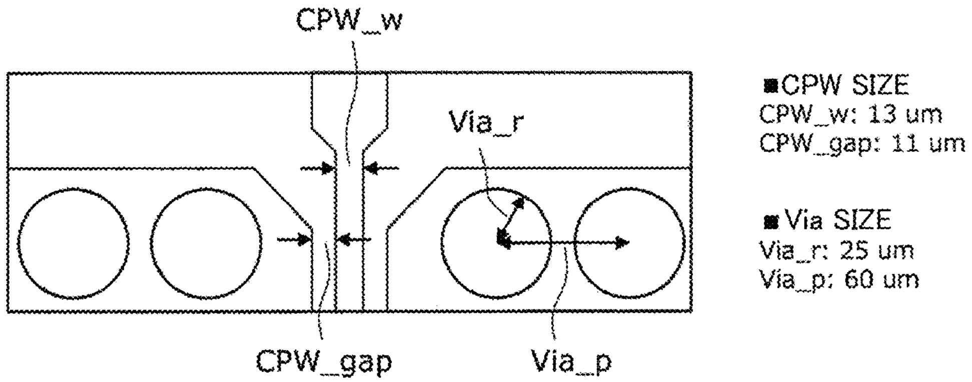
FIG. 8 is an explanatory view showing sizes of a CPW and a Via used in operation analysis.

FIG. 3 is an explanatory view of an analysis condition of the circuit-integrated antenna according to the first embodiment. FIG. 4 is an explanatory view of an antenna size of the circuit-integrated antenna according to the first embodiment. FIG. 5 is a plan view showing the configuration of the conventional patch antenna. FIG. 6 is an explanatory view of an analysis condition of the conventional patch antenna. FIG. 7 is an explanatory view of an antenna size of the conventional patch antenna. FIG. 8 is an explanatory view of sizes of a CPW and a Via used in operation analysis.

Figure 9:
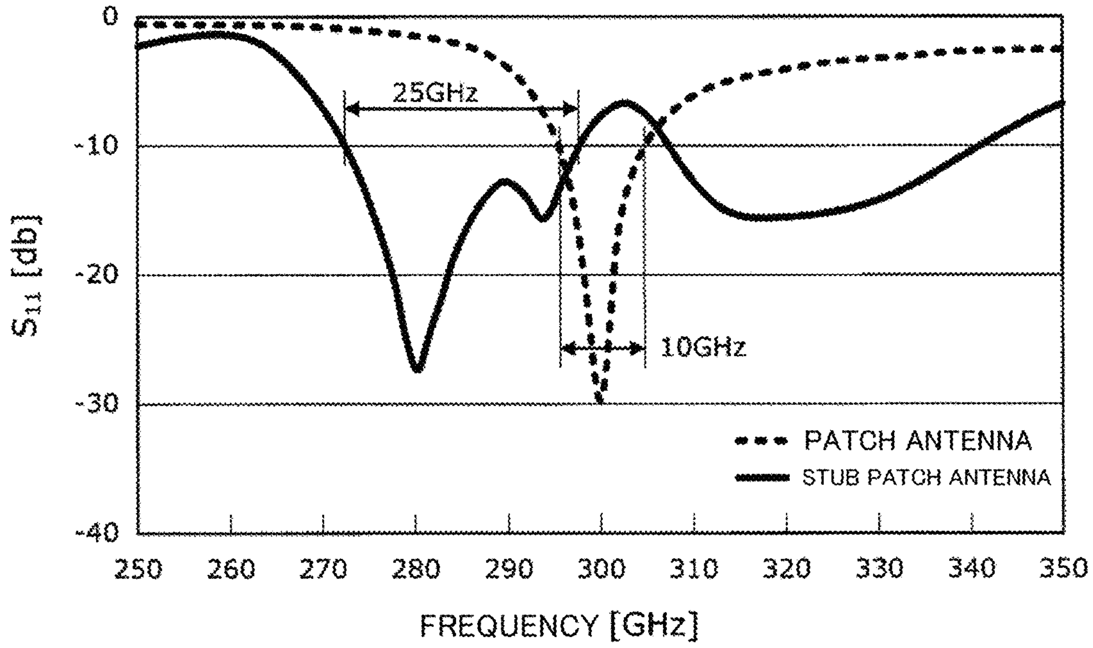
FIG. 9 is a graph showing frequency characteristics of a reflection coefficient related to the circuit-integrated antenna according to the first embodiment.
Figure 10:
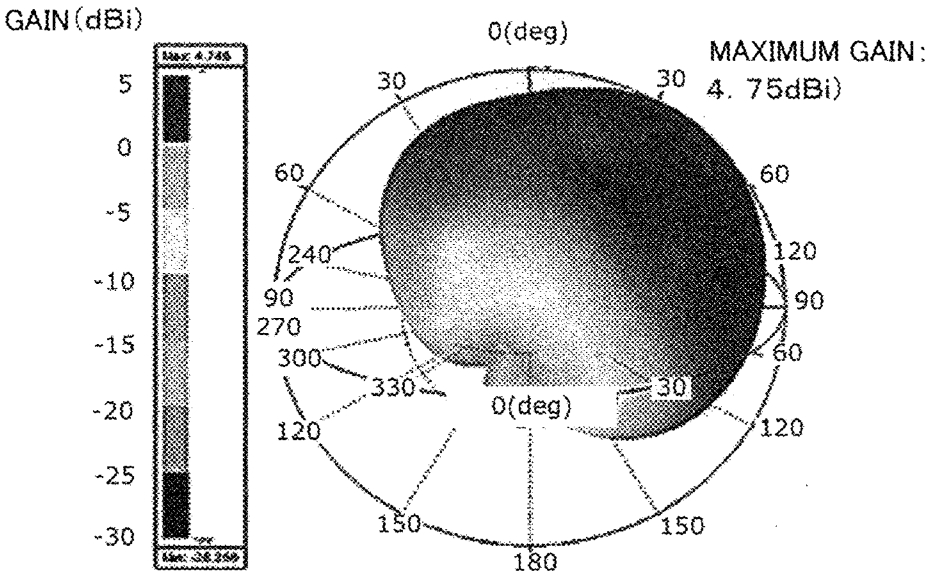
FIG. 10 is an explanatory view showing an analysis result of the circuit-integrated antenna according to the first embodiment.
Figure 11:
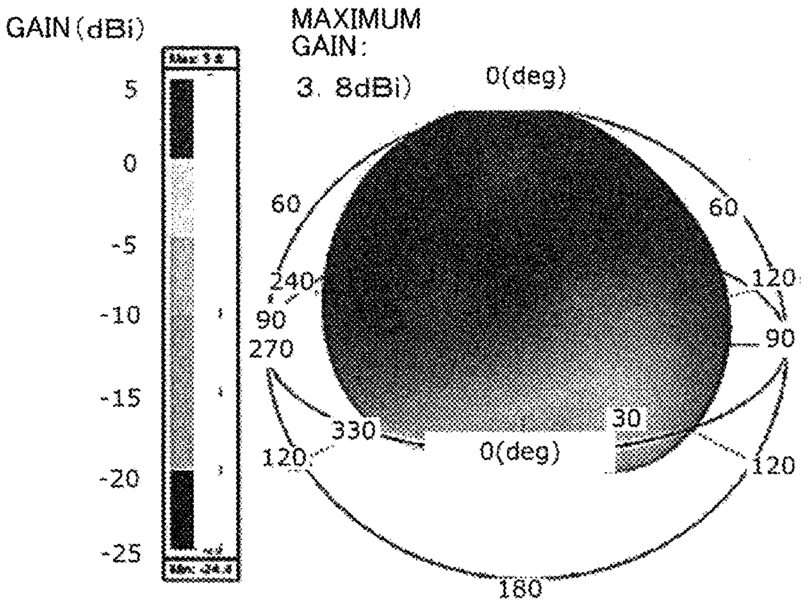
FIG. 11 is an explanatory view showing an analysis result of the conventional patch antenna.
Figure 12:
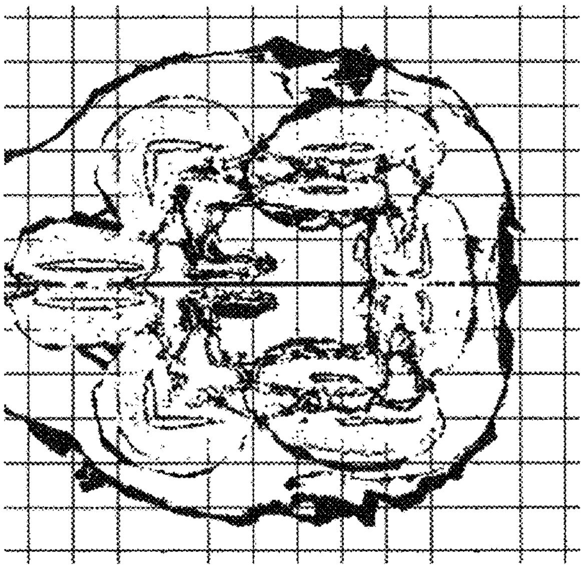
FIG. 12 is an explanatory view showing an electric field distribution of the circuit-integrated antenna according to the first embodiment.
Figure 13:
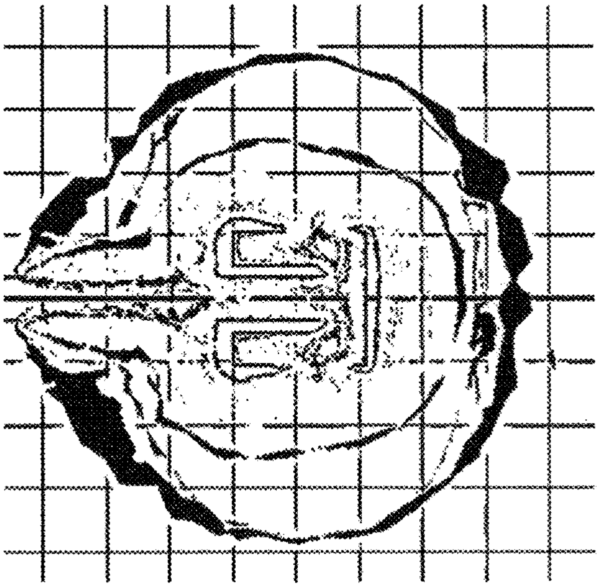
FIG. 13 is an explanatory view showing an electric field distribution of the conventional patch antenna.

In addition, FIG. 9 is a graph showing frequency characteristics of a reflection coefficient related to the circuit-integrated antenna according to the first embodiment. FIG. 10 is an explanatory view of the analysis result of the circuit-integrated antenna according to the first embodiment. FIG. 11 is an explanatory view of the analysis result of the conventional patch antenna. FIG. 12 is an explanatory view of an electric field distribution of the circuit-integrated antenna according to the first embodiment. FIG. 13 is an explanatory view of the electric field distribution of the conventional patch antenna.

In FIG. 3, with regard to the analysis conditions related to the circuit-integrated antenna 10 according to the present embodiment, a frequency band was set to 250 to 340 GHz, and analysis space was set to 1000 μm×1000 μm×1000 μm. In addition, as the thin film conductor of the antenna portion ANT (the patch conductor 12, the stub conductors 13A and 13B), gold (Au) having a film thickness of 0.6 μm was used. Further, an InP substrate having a thickness of 50 μm was used as the substrate B, and gold (Au) having a thickness of 4 μm was used as the ground plane GND. The thickness of the circuit mounting layer MIM was set to 1.8 μm, the thickness of SiN in the circuit mounting layer MIM was set to 0.77 μm, and the thickness of the upper insulation layer BCB was set to 1.8 μm. In addition, the size of a port PT provided at one end of the feeder line 11 was set to 200 μm (W)×150 μm (H), and an electromagnetic field of 1 W was input from the port PT.

In addition, as shown in FIG. 3 and FIG. 4, with regard to the antenna size of the circuit-integrated antenna 10 according to the present embodiment, the vertical or horizontal width of the patch conductor 12, i.e., a patch size Pat was set to 180 μm, a width MSL_x of the feeder line 11 was set to 34 μm, a length MSL_y thereof was set to 350 μm, a vertical or horizontal width Stub of the stub conductors 13A and 13B was set to 300 μm, and a width Stub_w of each of the stub conductors 13A and 13B was set to 40 μm. Further, a width Int_1 of the gap 14 was set to 20 μm, a width Int_2 of the gap 13C was set to 30 μm, a width Slit_x of each of the slits 15A and 15B was set to 10 μm, and a length slit_y of each of the slits 15A and 15B was set to 60 μm.

On the other hand, as shown in FIG. 5 and FIG. 6, a conventional patch antenna 50 used as a target for comparison is constituted by a feeder line 51 and a patch conductor 52 formed on the surface P of the substrate B.

The feeder line 51 is a transmission line which is constituted, as a whole, by the microstrip line such as the CPW and is used for feeding the radio-frequency electromagnetic field input from the outside to the patch conductor 52.

The patch conductor 52 is an antenna element (radiating element) which is constituted by a conductor which has an entire outer shape formed into a substantially square shape when viewed in a plan view, and radiates the electromagnetic field fed from the feeder line 11. In the patch conductor 52, two slits 55A and 55B which are parallel to each other along the direction Y are formed so as to extend toward an inner area of the patch conductor 12 in the vicinity of a connection portion of the feeder line 51. The multilayer structure of the patch antenna is similar to that in FIG. 2, and the ground plane GND is formed on the bottom surface R of the substrate B.

In FIG. 6, with regard to the analysis conditions related to the conventional patch antenna 50, the frequency band was set to 250 to 340 GHz, and the analysis space was set to 1000 μm×1000 μm×1000 μm. In addition, as the thin film conductor of the antenna portion ANT constituted by the feeder line 51 and the patch conductor 52, gold (Au) having a film thickness of 0.6 μm was used. Further, an InP substrate having a thickness of 50 μm was used as the substrate B, and gold (Au) having a thickness of 4 μm was used as the ground plane GND. In addition, the size of the port PT provided at one end of the feeder line 11 was set to 200 μm (W)×150 μm (H), and the electromagnetic field of 1 W was input from the port PT.

Further, as shown in FIG. 7 and FIG. 8, with regard to the antenna size of the conventional patch antenna 50, the vertical or horizontal width of the patch conductor 52, i.e., the patch size Pat was set to 180 μm, the width MSL_x of the feeder line 11 was set to 34 μm, the length MSL_y thereof was set to 350 μm, the width Slit_x of each of the slits 55A and 55B was set to 10 μm, and the length Slit_y of each of the slits 55A and 55B was set to 60 μm.

In addition, as shown in FIG. 8, a width CPW_w of the CPW was set to 13 μm, and a gap CPW_gap between the CPW and another conductor was set to 11 μm. Further, a radius Via_r of the Via was set to 25 μm, and an arrangement pitch interval Via_p of the Via was set to 60 μm. These sizes were common to both of the circuit-integrated antenna 10 according to the present embodiment and the conventional patch antenna 50.

FIG. 9 shows frequency characteristics of an input reflection coefficient S11 at an input end (port) of the feeder line 11 as the analysis result of the circuit-integrated antenna 10 according to the present embodiment. According to the circuit-integrated antenna 10 (stub patch antenna) of the present embodiment, as shown in FIG. 11, the bandwidth at the input reflection coefficient S11 of −10.0 dB is 25 GHz, and it can be seen that the bandwidth is increased to about 2.5 times the bandwidth of the conventional patch antenna 50 of 10 GHz.

FIG. 10 shows directivity and radiation efficiency as the analysis result of the circuit-integrated antenna 10 according to the present embodiment. In addition, FIG. 11 shows directivity and radiation efficiency as the analysis result of the conventional patch antenna 50. As shown in FIG. 11, the maximum gain of the conventional patch antenna 50 is about 3.80 dBi, but, according to the circuit-integrated antenna 10 of the present embodiment, as shown in FIG. 10, the maximum gain is as high as 4.75 dBi, and it can be seen that the maximum gain is increased by about 1 dBi as compared with that of the patch antenna 50.

From these, it can be seen that, in the circuit-integrated antenna 10 according to the present embodiment, the band is widened and the gain is increased in radiation characteristics as compared with those of the conventional patch antenna 50. The circuit-integrated antenna 10 according to the present embodiment can be implemented with a size smaller than a half wavelength, and hence, by arranging the circuit-integrated antennas 10 in an array, the gain is significantly increased as compared with the case where the conventional patch antenna 50 is used.

In addition, FIG. 12 shows the electric field distribution as the analysis result of the circuit-integrated antenna 10 according to the present embodiment. Further, FIG. 13 shows the electric field distribution as the analysis result of the conventional patch antenna 50. As shown in FIG. 13, while the electric field is concentrated in a boundary portion of the structure in the case of the conventional patch antenna 50, in the case of the circuit-integrated antenna 10 according to the present embodiment, the circuit-integrated antenna 10 is different from the conventional patch antenna 50 in that the electric field is concentrated not only in the boundary portion of the structure but also in an area between the patch conductor 12 and the stub conductors 13A and 13B. It is considered that, in the structure of the latter, the electric field formed outside the structure and the electric field formed inside the structure strengthen each other and the gain is thereby increased.

Effect of First Embodiment

Thus, in the present embodiment, the stub conductors 13A and 13B are disposed so as to surround the outer periphery of the patch conductor 12 and be spaced from the patch conductor 12 with the gap 14 positioned between the stub conductors 13A and 13B and the patch conductor 12. With this, it is possible to form the electric capacity between the patch conductor 12 and the stub conductors 13A and 13B, i.e., in the gap 14, and it becomes possible to widen the band and increase the gain in radiation characteristics of the circuit-integrated antenna 10. Consequently, it is possible to increase the directivity and the gain of the on-chip antenna, and hence it becomes possible to perform wireless communication with a longer distance. In addition, wide-band radiation characteristics are obtained, and hence the capacity of wireless communication in a millimeter wave band/a terahertz band in the entire system is expected to be increased by an increase in the amount of information which can be transmitted. From the viewpoint of chip design, it is possible to reduce the size of an antenna and improve the gain and the radiation efficiency in a wide band without changing the original configuration of the antenna by providing the patch.

In addition, in the circuit-integrated antenna 10 according to the present embodiment, when impedance matching with the feeder line 11 is performed, it is possible to perform adjustment by using the sizes of the stub conductors 13A and 13B and the gap 14 in addition to the sizes of the slits 15A and 15B. Consequently, in the design process of the circuit-integrated antenna 10, it is possible to obtain high flexibility in the control of center frequency, bandwidth, directivity, gain, and the like. At this point, an antenna element having high directivity can alleviate a problem such as electromagnetic field coupling between the elements, and hence it is possible to significantly increase gain improvement effect of a single element according to the number of elements. In addition, it is possible to make an element interval shorter than that of the conventional patch antenna, and a reduction in size and an improvement in beam controllability are expected to be achieved.

With this, implementation with a size smaller than a half wavelength is allowed, and hence an array patch antenna in which a plurality of the antenna portions ANT each of which is constituted by the patch conductor 12 and the stub conductors 13A and 13B is arranged in an array on the same substrate B may be configured. By arranging the antenna portions ANT in the array, it becomes possible to significantly increase the gain as compared with the case where a single patch antenna is used.

In addition, by arranging the antenna portions ANT in the array, it is possible to automatically control a radiation direction by beam forming while having the gain equal to or higher than that of a conventional wide-band antenna designed with a wavelength size such as a Vivaldi antenna. For example, in the case where ultra-high-speed wireless communication in a band of 300 GHz is assumed to be performed, a slight displacement of a transmission/reception position significantly influences an SN ratio, and hence, by constantly optimizing the SN ratio by finely adjusting a beam angle, it becomes possible to perform high-bit-rate wireless transmission in a state in which a modulation level is large.

Further, in the case where the stub patch antennas of the present embodiment are arranged in the array, it is possible to reduce inter-element coupling by concentrating the electric field in the electric capacity formed between the stub and the patch and trapping the electric field therein, and obtain the gain close to the theoretical limit value of the gain derived from an array factor.

Second Embodiment

Figure 14:
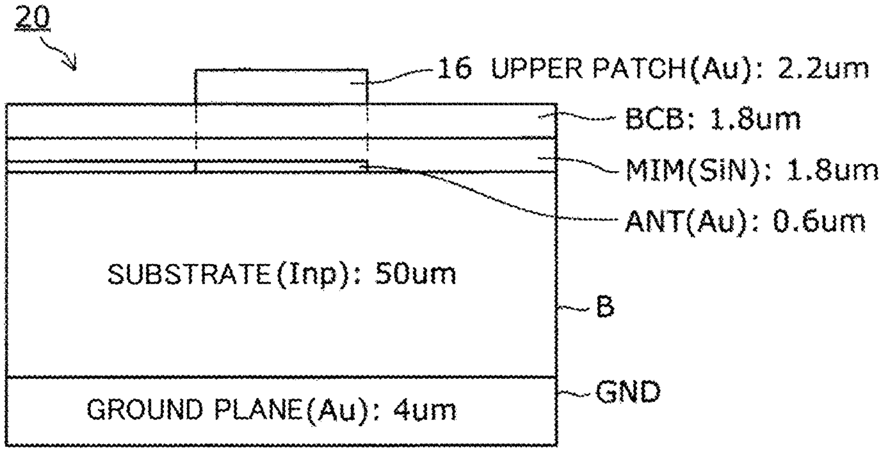
FIG. 14 is a cross-sectional view showing a multilayer structure of a circuit-integrated antenna according to a second embodiment.

Next, with reference to FIG. 14, a description will be given of a circuit-integrated antenna 20 according to a second embodiment of the present invention. FIG. 14 is a cross-sectional view showing the multilayer structure of the circuit-integrated antenna according to the second embodiment.

In the circuit-integrated antenna 20 according to the present embodiment, an upper patch conductor 16 is provided above the antenna portion ANT in the circuit-integrated antenna 10 in FIG. 1 described above.

That is, as shown in FIG. 14, in the circuit-integrated antenna 20 according to the present embodiment, the upper patch conductor 16 having substantially the same shape as the outer shape of the stub conductors 13A and 13B is provided above (as a layer above) the antenna portion ANT constituted by the patch conductor 12 and the stub conductors 13A and 13B, specifically on the surface of the upper insulation layer BCB. The upper patch conductor 16 is made of a conductor thin film of, e.g., gold (Au).

According to this structure, a radio wave radiated from the antenna portion ANT serving as a lower layer is coupled to the upper patch conductor 16 serving as an upper layer, and the direction of the radio wave in a frequency band having low directivity is corrected. Accordingly, the upper patch conductor 16 has the function of increasing the gain in an adjacent frequency band and smoothing radiation characteristics while retaining the maximum gain. In addition, the electric field is concentrated in an area between the layer of the antenna portion ANT and the layer of the upper patch conductor 16, whereby it becomes possible to make the size of the structure smaller than that of the stub patch antenna in FIG. 1 in a state in which a corresponding frequency band and a bandwidth are maintained.

Analysis Result in Second Embodiment

Figure 15:
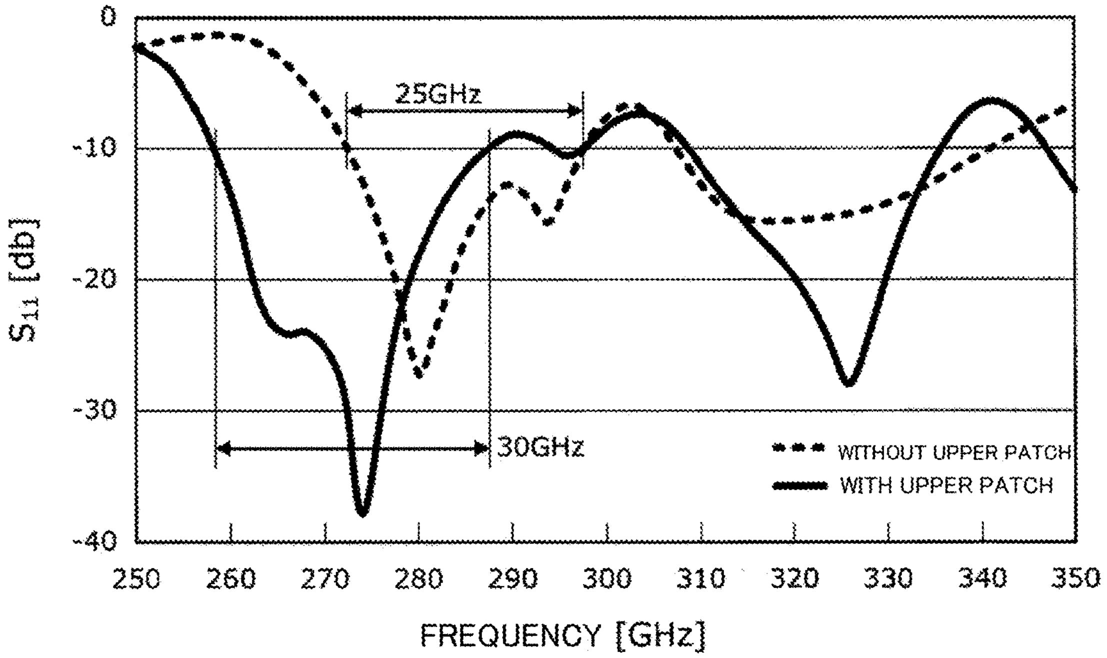
FIG. 15 is a graph showing frequency characteristics of a reflection coefficient related to the circuit-integrated antenna according to the second embodiment.
Figure 16:
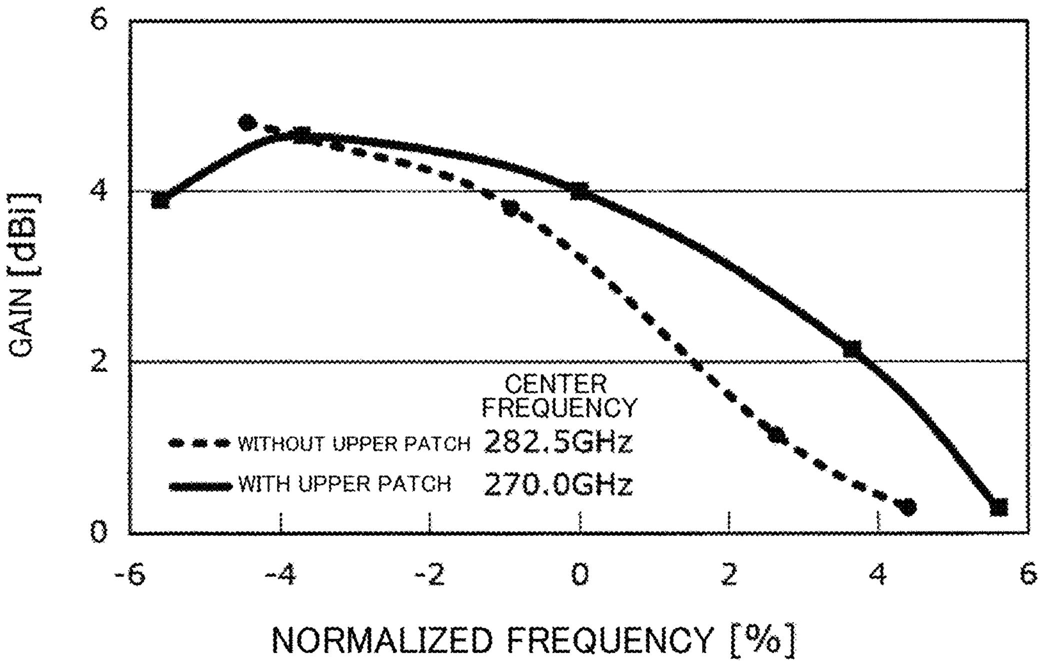
FIG. 16 is a graph showing gain frequency characteristics of the circuit-integrated antenna according to the second embodiment.
Figure 17:
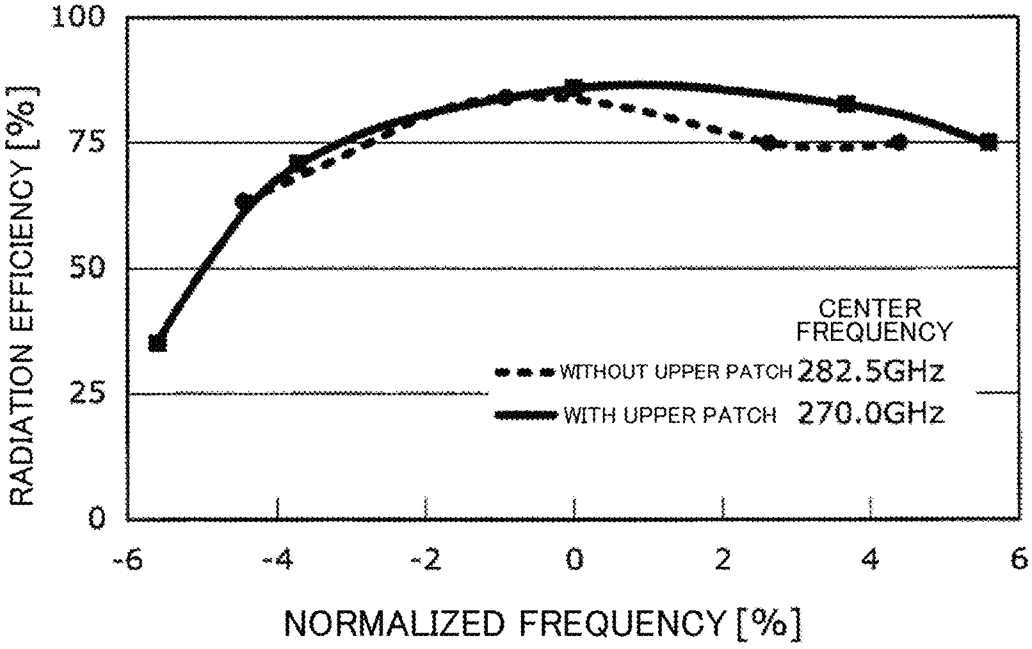
FIG. 17 is a graph showing radiation efficiency frequency characteristics of the circuit-integrated antenna according to the second embodiment.

Next, with reference to FIGS. 15 to 17, a description will be given of analysis results by simulation related to the circuit-integrated antenna 20 according to the present embodiment and the conventional patch antenna. FIG. 15 is a graph showing frequency characteristics of the reflection coefficient related to the circuit-integrated antenna according to the second embodiment. FIG. 16 is a graph showing gain frequency characteristics of the circuit-integrated antenna according to the second embodiment. FIG. 17 is a graph showing radiation efficiency frequency characteristics of the circuit-integrated antenna according to the second embodiment.

The analysis conditions related to the circuit-integrated antenna 20 according to the present embodiment are similar to those of the circuit-integrated antenna without the upper patch conductor shown in FIG. 3 and FIG. 4 and, specifically, the frequency band was set to 250 to 340 GHz, and the analysis space was set to 1000 μm×1000 μm×1000 μm. In addition, as the thin film conductor of the antenna portion ANT (the patch conductor 12, the stub conductors 13A and 13B), gold (Au) having a film thickness of 0.6 μm was used. Further, an InP substrate having a thickness of 50 μm was used as the substrate B, and gold (Au) having a thickness of 4 μm was used as the ground plane GND. The thickness of the circuit mounting layer MIM was set to 1.8 μm, the thickness of SiN in the circuit mounting layer MIM was set to 0.77 μm, and the thickness of the upper insulation layer BCB was set to 1.8 μm. In addition, the size of the port PT provided at one end of the feeder line 11 was set to 200 μm (W)×150 μm (H), and the electromagnetic field of 1 W was input from the port PT. With regard to the upper patch conductor 16, the vertical or horizontal width, i.e., the patch size Pat was set to 300 μm which was identical to that of the stub conductors 13A and 13B, and the film thickness thereof was set to 2.2 μm.

Further, with regard to the antenna size of the circuit-integrated antenna 20 according to the present embodiment, the size of the entire antenna portion ANT is reduced by about 17% as compared with the that shown in each of FIG. 3 and FIG. 4. Specifically, the vertical or horizontal width of the patch conductor 12, i.e., the patch size Pat was set to 150 μm, the width MSL_x of the feeder line 11 was set to 34 μm, the length MSL_y thereof was set to 350 μm, the vertical or horizontal width Stub of the stub conductors 13A and 13B was set to 250 μm, and the width Stub_w of each of the stub conductors 13A and 13B was set to 30 μm. In addition, the width Int_1 of the gap 14 was set to 20 μm, the width Int_2 of the gap 13C was set to 30 μm, the width Slit_x of each of the slits 15A and 15B was set to 10 μm, and the length Slit_y of each of the slits 15A and 15B was set to 60 μm.

FIG. 15 shows frequency characteristics of the input reflection coefficient S11 at the input end (port) of the feeder line 11 as the analysis result of the circuit-integrated antenna 20 according to the present embodiment. According to the circuit-integrated antenna 20 (with the upper patch conductor) of the present embodiment, as shown in FIG. 15, the bandwidth at the input reflection coefficient S11 of −10.0 dB is 30 GHz, and it can be seen that the bandwidth is increased by about 16% as compared with the bandwidth of the above-described circuit-integrated antenna 10 (without the upper patch conductor) of 25 GHz.

In addition, FIG. 16 shows frequency characteristics of the gain as the analysis result of the circuit-integrated antenna 20 according to the present embodiment, and FIG. 17 shows frequency characteristics of the radiation efficiency as the analysis result of the circuit-integrated antenna 20 according to the present embodiment. As shown in FIG. 16 and FIG. 17, according to the circuit-integrated antenna 20 (with the upper patch conductor) of the present embodiment, it can be seen that the gain and the radiation efficiency are improved and the circuit-integrated antenna 20 is further stabilized as compared with the circuit-integrated antenna 10 (without the upper patch conductor) described above. Consequently, by providing the upper patch conductor 16, it is possible to achieve a reduction in size and improvements in the gain and the radiation efficiency in a corresponding frequency band at the same time. Note that, in each of FIG. 16 and FIG. 17, for comparison, a normalized frequency obtained by normalizing a corresponding frequency band with respect to each of center frequencies is used as the horizontal axis.

Effect of Second Embodiment

Thus, in the present embodiment, the upper patch conductor 16 having substantially the same shape as the outer shape of the stub conductors 13A and 13B is provided above the antenna portion ANT constituted by the patch conductor 12 and the stub conductors 13A and 13B.

With this, it is possible to not only widen the bandwidth of the circuit-integrated antenna 20 at the input reflection coefficient S11 of −10.0 dB but also improve the gain and the radiation efficiency in the corresponding frequency band, and it is possible to achieve a reduction in size and improvements in the gain and the radiation efficiency in the corresponding frequency band at the same time.

Extension of Embodiment

The present invention has been described thus far with reference to the embodiments, but the present invention is not limited to the above embodiments. The configuration and details of the present invention can be altered in various manners which can be understood by those skilled in the art within the scope of the present invention. In addition, the embodiments can be arbitrarily combined and implemented without inconsistency.

REFERENCE SIGNS LIST

10, 20 Circuit-integrated antenna
11 Feeder line
12 Patch conductor
12A, 12C Side
12B Connection portion
13A, 13B Stub conductor
13C, 14 Gap
15A, 15B Slit
16 Upper patch conductor
MIM Circuit mounting layer
BCB Upper insulation layer
ANT Antenna portion
B Substrate
P Surface
R Bottom surface
GND Ground plane.

The invention claimed is:

1. A circuit-integrated antenna comprising:

a patch conductor on a surface of a substrate and configured to radiate a fed electromagnetic field;

a feeder line on the surface of the substrate and configured to feed an input electromagnetic field to the patch conductor;

two slits extending toward an inner side of the patch conductor on both sides of a connection portion between the patch conductor and the feeder line, wherein the two slits are parallel to the feeder line; and a pair of stub conductors on the surface of the substrate and protruding from both sides of the feeder line, wherein the pair of stub conductors are symmetrically disposed to have the feeder line between the pair of stub conductors so as to surround an outer periphery of the patch conductor and be spaced from the patch conductor with a first gap positioned between the pair of stub conductors and the patch conductor.

2. The circuit-integrated antenna according to claim 1, wherein:

first ends of the pair of stub conductors are connected to the feeder line; and second ends of the pair of stub conductors are disposed so as to face each other with a second gap positioned between the second ends on a side opposite to the connection portion with the patch conductor positioned between the second ends and the connection portion.

3. The circuit-integrated antenna according to claim 1, wherein:

the first gap is connected to first end portions of the two slits.

4. The circuit-integrated antenna according to claim 1, wherein:

each of the pair of stub conductors is disposed into a strip shape which has a constant width.

5. The circuit-integrated antenna according to claim 1, wherein the first gap has a constant width.

6. The circuit-integrated antenna according to claim 1, further comprising:

an upper patch conductor above the patch conductor and the pair of stub conductors.

7. A method of forming a circuit-integrated antenna, the method comprising:

forming a patch conductor on a surface of a substrate, the patch conductor being configured to radiate a fed electromagnetic field;

forming a feeder line on the surface of the substrate, the feeder line being configured to feed an input electromagnetic field to the patch conductor;

forming two slits extending toward an inner side of the patch conductor on both sides of a connection portion between the patch conductor and the feeder line, wherein the two slits are parallel to the feeder line; and forming a pair of stub conductors on the surface of the substrate and protruding from both sides of the feeder line, wherein the pair of stub conductors are symmetrically disposed to have the feeder line between the pair of stub conductors so as to surround an outer periphery of the patch conductor and be spaced from the patch conductor with a first gap positioned between the pair of stub conductors and the patch conductor.

8. The method according to claim 7, wherein:

first ends of the pair of stub conductors are connected to the feeder line; and second ends of the pair of stub conductors are disposed so as to face each other with a second gap positioned between the second ends on a side opposite to the connection portion with the patch conductor positioned between the second ends and the connection portion.

9. The method according to claim 7, wherein:

the first gap is connected to first end portions of the two slits.

10. The method according to claim 7, wherein:

each of the pair of stub conductors is disposed into a strip shape which has a constant width.

11. The method according to claim 7, wherein the first gap has a constant width.

12. The method according to claim 7, further comprising:

forming an upper patch conductor above the patch conductor and the pair of stub conductors.

* * * * *